Aug. 5, 1924.
J. H. ELSPASS
1,504,108
BLEACHING AND SWEATING APPARATUS FOR DEHYDRATING MATERIALS
Filed Feb. 9, 1922
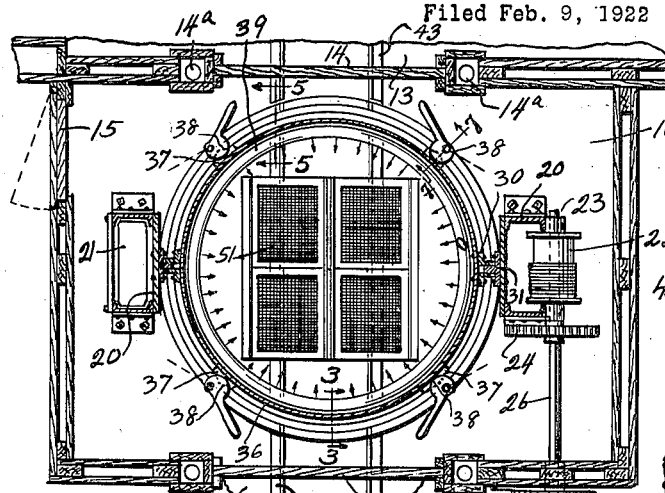
Fig. 1.
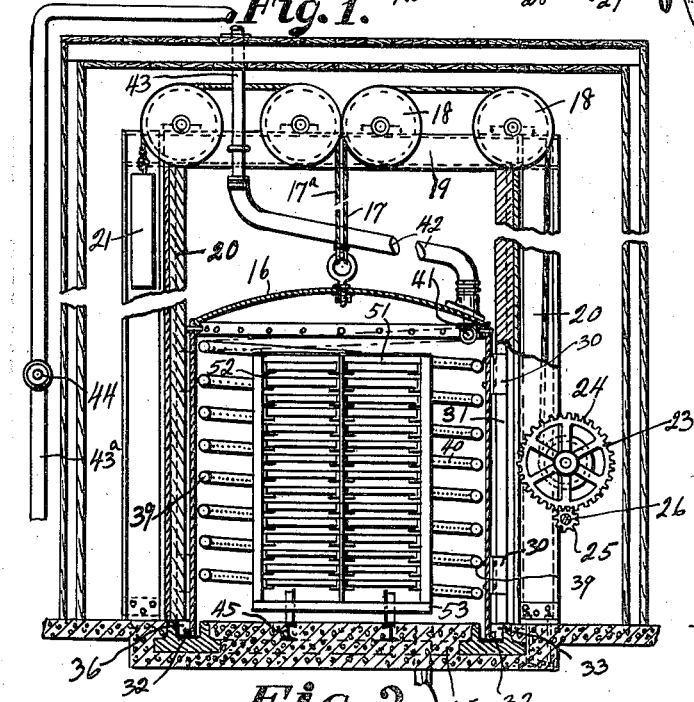
Fig. 2.
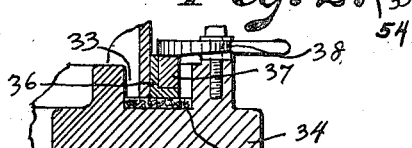
Fig. 7.
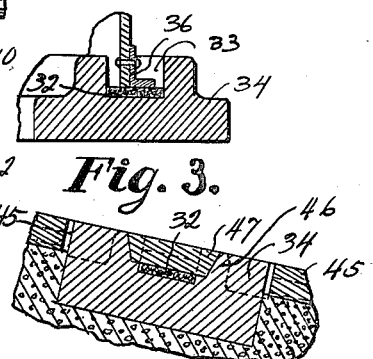
Fig. 3.
Fig. 5.
Fig. 4.
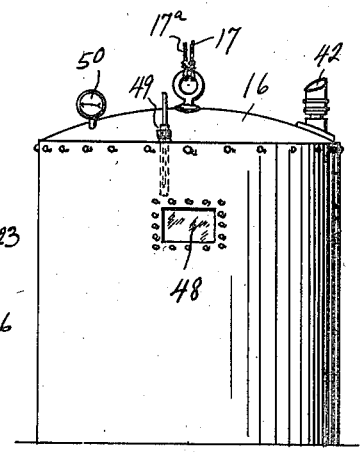
Fig. 6.
INVENTOR.
J. H. Elspass
Watson E. Coleman
ATTORNEY.

Patented Aug. 5, 1924.

1,504,108

UNITED STATES PATENT OFFICE.

JOHN H. ELSPASS, OF WICHITA, KANSAS, ASSIGNOR OF ONE-THIRD TO M. JOSEPHINE MALONEY, OF OKLAHOMA CITY, OKLAHOMA.

BLEACHING AND SWEATING APPARATUS FOR DEHYDRATING MATERIALS.

Application filed February 9, 1922. Serial No. 535,420.

*To all whom it may concern:*

Be it known that I, JOHN H. ELSPASS, a citizen of the United States, residing at Wichita, in the county of Sedgwick and State of Kansas, have invented certain new and useful Improvements in Bleaching and Sweating Apparatus for Dehydrating Materials, of which the following is a specification, reference being had to the accompanying drawings.

This invention relates to the art of preserving fruit, vegetables and other matter by dehyration, and particularly to means for bleaching and processing the material to be preserved prior to its complete dehydration.

In all dehyrdation processes, it is common to first subject the fruit, vegetables or other material to be preserved to the action of steam jets or water jets for the purpose of bleaching the material, and the general object of my invention is to provide an improved mechanism for this purpose which will not only bleach the material but which will subject it to the action of steam under pressure, whereby the fruit or other material will be expanded, its capillaries opened, and the fruit sweated, this treatment not only acting to expand the fruit but rendering the baceteria in the fruit or vegetables active and acting to soften the cellular tissue and causing the starches to be transformed into sugar.

A further object is to provide a mechanism for this purpose so designed that the fruit or vegetables may be submitted to an even pressure while under the action of the steam.

A still further object is to provide a construction of this kind which is particularly adapted for use with a dehydrating tunnel, that is with a tunnel wherein cars supporting racks containing the fruit are shifted gradually along the tunnel while the fruit is being dried, as fully described and illustrated in my pending application for patent filed February 9, 1922, Serial No. 535,421.

Another object is to provide a construction of this character comprising a chamber into which the car is shifted, this chamber having therein a vertically movable bell which, after the car is in place, is lowered so as to entirely enclose the car or truck, this bell containing within it a steam coil having perforations and connected to a source of steam so that as soon as the bell is lowered the steam may be turned on to cause the immediate filling of the bell with steam and the subjection of the fruit to heat, pressure and humidity for a certain predetermined length of time, and to provide means whereby the steam may be projected in lines extending parallel to the fruit trays carried by the racks so that every portion or every bit of the fruit will be subjected to steam.

Still another object is to provide means whereby the bell or steam chamber may be locked closed against the pressure of the steam, whereby the steam chamber or bell may be readily raised or lowered with but slight effort and whereby the steam from the steam chamber may be withdrawn into the tunnel and prevented from entering the work room.

Other objects will appear in the course of the following description.

My invention is illustrated in the accompanying drawings, wherein:—

Figure 1 is a horizontal sectional view of the steam bleaching apparatus constructed in accordance with my invention, the section being taken just above the operating wheel 24;

Figure 2 is a vertical sectional view of the apparatus shown in Figure 1;

Figure 3 is a section on the line 3—3 of Figure 1;

Figure 4 is a fragmentary top plan view of the track at its intersection of the circular foundation wall;

Figure 5 is a section on the line 5—5 of Figure 4;

Figure 6 is a side elevation of the bell;

Figure 7 is a section on the line 7—7 of Figure 1.

In the drawings, 10 designates a room or chamber illustrated as having double walls and communicating by an entrance 11 with a work room or preparing room where the fruit to be dehydrated is washed, sliced and otherwise prepared and then placed in trays, these trays being in turn placed upon trucks in this room. This entrance is closed by a door 12 which is preferably a vertically sliding door. Opposite the entrance 11 there is a door opening 13 leading into the tunnel, that is the relatively long chamber traversed by the cars or trucks containing the trays and in which the fruit is subjected to a drying process. A tunnel of this character is particularly adapted to be used in connection with my bleaching and sweating chamber, as illustrated in my co-pending application filed of even date herewith. The opening 13 may be closed by a sliding door 14 so as to cut off communication between the chamber 10 and the tunnel, while the door 12 affords means for cutting off communication betwen the chamber 10 and the work room or preparing room.

One side wall of the chamber 10 may also be provided with a door 15 whereby workmen can readily gain entrance to the chamber 10 to observe the material being bleached and sweated and determine when the desired result has been accomplished.

Suspended within the chamber 10 for vertical movement is a bell-shaped steam chamber 16, which I will hereafter term the steam bell. As illustrated, this bell is supported by cables 17 and 17$^a$ which extend upward over pulleys 18 mounted upon the cross beam 19, which in turn is mounted upon uprights 20. These uprights 20 are hollow and formed of channel beams and plates in an obvious manner and the cables 17 and 17$^a$, after passing over the pulleys 18, extend downward through these hollow columns 20. The cable 17$^a$ is connected to a counterweight 21, while the cable 17 is connected to a drum 22 mounted on a shaft 23 carried in bearings on the column, this shaft carrying a gear wheel 24 which is engaged by a pinion 25 mounted upon a shaft 26 which extends through the front wall of the chamber 10 and is provided with a crank handle 27 whereby the shaft may be rotated to cause the winding up of the cable 17. The shaft is provided with the ratchet wheel 28 with which a pawl 29 engages. By this means the bell may be readily raised or lowered from the work or preparing room.

The bell is preferably guided by angle irons 30 engaging on each side of a T-shaped guide iron 31 attached to each column 20. The bell at its lower end, when the bell is lowered, rests upon a packing 32 of felt or other like material disposed in a circular recess 33 formed in an annular foundation plate 34 sunk into the floor 35 of the chamber 10. Attached to the lower edge of the bell is a flange 36 so as to provide a relatively broad footing for the lower end of the bell resting upon the packing strip 32, and attached to this flange at intervals are blocks 37. Mounted upon the outer wall of the channel 34 are clamping cams 38 which are oscillatable in a horizontal direction, the under faces of these cams being inclined so that when the cams are turned to the position shown in Figure 1 they will clamp against the blocks 37 and force the bell tightly down in engagement with the packing so as to prevent any escape of steam from the interior of the bell.

Mounted within the interior of the bell and extending in convolutions around the bell is a steam pipe 39 having perforations 40. This steam pipe extends the entire height of the bell and the upper end of the steam pipe is connected to a steam inlet pipe 41 which extends out through the top of the bell and is connected to a flexible steam pipe section 42. This in turn is connected to a pipe section 43 which is mounted upon the beam 19 and extends out through a wall or ceiling of the chamber 10 and is connected by a pipe 43$^a$, diagrammatically illustrated in Figure 2, to any suitable source of steam. A valve 44 is provided in this pipe 43 and located in any suitable position whereby the flow of steam to the coils 40 may be controlled.

Extending through the chamber 10 and through the openings 11 and 13 are tracks 45. These tracks are broken away at the intersection with the channel 34, as illustrated most clearly in Figures 4 and 5, and the ends of the track are formed with seats 46 for the reception of a bridge section 47 of the track which is adapted to be inserted in the seats 46 when a car is run into the chamber 10 or run out therefrom. When a car is in position in the center of the chamber 10 and beneath the upraised bell 16, then the bridge sections 47 are removed to permit the bell to seat against the packing 32. After the material has been submitted to the action of the steam within the bell 16 and the bell is raised and the car or truck supporting the frame is to be moved out through the opening 13, then the bridge sections are replaced. The bell is preferably formed with a sight opening 48 whereby the material may be inspected and is also provided with a thermometer 49 of any suitable character whereby the temperature may be determined. Preferably the bell is also provided with a pressure indicating device 50. The fruit, vegetables or other matter to be bleached and sweated is disposed in trays 51, which trays are provided with bottoms of wire netting or other foraminated material, as is usual, and these trays are mounted on racks 52 forming part of a truck 53 having wheels adapted to run upon the tracks 45.

As is illustrated more fully in my co-pending application, the opening 13 leads into the drying tunnel. This tunnel is open at one end for the escape of the warm, moist air and means is provided in this tunnel for causing a draft of air through the tunnel toward this open end of the tunnel. Thus it will be seen that if the door 14 be raised and then the bell 16 raised that the steam which has been confined within the bell 16 will escape through the opening 13 into the tunnel and be carried off by the draft therein. Thus no steam escapes into the work room, as would be the case were the chamber 10 to be used as the chamber within which the material was to be subjected to the action of steam.

Assuming that no car or truck is within the chamber 10 and that the door 14 is closed and the door 12 open, then the car is run onto the tracks 45 into the chamber 10 to a position immediately beneath the bell. The door 12 is then closed, the workman rotates the crank 27 to lower the bell around the car or truck, and turns on the steam. The steam issuing from the perforations 40 is discharged radially inward against the racks carried by the truck, and because the convolutions of the steam pipe are disposed at a very slight angle to the horizontal the steam will be projected between the superposed trays and every particle of the fruit will thus be subjected to the action of the steam. Inasmuch as the bell is clamped down tightly against the packing 32, it is obvious that the steam will entirely fill the bell and cannot escape therefrom and that the steam may be controlled so that a certain predetermined steam pressure may be secured within the bell. After the steam has completed its action upon the material being processed, which will occur in from three to five minutes, the workman enters the chamber 10 through the door 15, for instance, and raises the door 14, which is counter-weighted in an obvious manner, as by counter-weights 14ª, and then he retires from the chamber 10, closing the door 15, and by the crank 27 raises the bell. The steam which has been confined within the bell then escapes through the opening 13 into the tunnel and is carried off by the draft therein. As soon as sufficient steam has escaped to permit the workman to enter the chamber 10, he again enters the chamber and shoves the truck 53 out into the tunnel and onto a turn table therein, as illustrated in my pending application before referred to. Then the truck is carried along the dehydrating tunnel and the fruit is dried. As soon as a truck has been shoved into the tunnel, the door 14 is closed, the door 12 opened, and another truck pushed in position, the bell again lowered, and the operation repeated.

It will be seen that with this construction no steam enters the working room or preparing room, which would be extremely disagreeable and render conditions in there very unpleasant to the workmen. While the steam is on within the bell 16, no steam is within the chamber 10 and as a consequence the workmen may enter the chamber 10 to observe the condition of the material being treated and to raise or lower the doors 14 or 12. When the bell is raised, the chamber 10 becomes filled with steam, it is true, but this steam is immediately withdrawn through the opening 13 so that when the workman enters the room 10 and when the door 12 is finally opened there is no steam within the chamber 10. Another reason for not admitting the steam directly to the chamber 10 and eliminating the bell 16 is that it is practically impossible to construct the chamber 10 so as to be steam-tight without rendering it difficult to open or close the doors so that steam may be kept within the chamber 10 under pressure. Furthermore, of course, the chamber is relatively large and as a consequence there would be very great waste of steam.

With this apparatus the fruit is subjected from three to five minutes to the action of steam at from two to fifteen degrees of pressure and to a heat of about 102° F. The effect of the steam, heat and pressure is to cause the fruit to expand, thereby distending the capillaries of the fruit and permitting the fruit to sweat the moisture out without, however, causing the fruit to dry up on the outside. Where fruit or other material is subjected merely to a dry heat, the dry heat tends to dry the material quickly on the exterior portion of the material while the interior of the material is still moist and more or less filled with water. Uniform drying is not accomplished under these circumstances. Furthermore, fruit dried in this way tends to crack. By subjecting the fruit, vegetable or other material being treated to the action of steam uniformly distributed around the piece of material and subjecting the fruit at the same time to a uniform degree of heat and presure, the fruit or other material is softened and is cured or slightly cooked. The moist heat sets up a bacterial action and there is an increase in the sugar content of the fruit. The action of the steam tends to keep the fibrous tissues in the cell pliable and active, while at the same time the fruit or vegetables are sweated of their water. If a dry heat were applied to the material the fibrous portions of the material would be hardened and as a consequence the fruit or vegetable matter would not be capable of re-absorbing moisture. This produces products which are tough and leathery and which remain hard and consequently more or less indigestible even after they are cooked. This sweating process equalizes the moisture content throughout the fruit or vegetables from the center of the article to its exterior surface.

It will be seen that with this construction also the steam being under pressure within the bell 16 has the same moisture content at all points and this permits the bacteria in the fruit or other article to transform the starches to sugar and to expand and soften the cellular structure so that when the process of removing the moisture is being carried out, the products are in the proper condition for giving up this moisture rapidly and without any rupture of the cells. I have found by experience that the treating of the fruit, vegetable, or other article by means of steam under pressure is a most important step in the process of preserving these articles by dehydration and that without this step it is impossible to secure the proper dehydration of the article. In certain dehydration apparatus having a drying tunnel, the trucks containing the racks of material to be dried are subjected, as they pass along the tunnel, to the action of jets of steam or of water, this treatment being designed to secure the same result as in my case, but such treatment does not secure this result because the steam cannot be kept under any pressure because the steam is carried off as rapidly as it is evaporated by the draft of warm air through the tunnel from one end to the other. Furthermore, it is impossible to secure any uniform action of the steam upon the racks of material as the chamber is not closed and as a consequence the pressure at any one point of the chamber or tunnel is never the same as at any other point. Furthermore, it is practically impossible to subject any particular piece of material under treatment to the action of steam for a sufficiently great length of time to have any real effect upon the article.

Experts now agree that dehydration must be effected in a humid, heated atmosphere and that proper dehydration cannot be secured unless there is humidity in the atmosphere. It is impossible in the ordinary tunnel such as commonly used in dehydration plants to secure a sufficient humidity to initially expand the capillaries of the fruit and permit the fruit or vegetables to be sweated. By treating the fruit or vegetables in the steam chamber or steam bell as above described, it sets the tissues, the fiber and the color, leaving the article in such a condition that the subsequent heat applied thereto may withdraw the moisture from the interior of the fruit, and it is only by treating the article by steam as described that the fruit is put in such condition that it will return to its normal size when eventually immersed in water.

Certain vegetables and fruit require to be thoroughly steam treated or processed in order to make them edible after being dried, and in order that they may return to their original condition. Thus, for instance, pumpkin flour cannot return to its original condition and be of any value whatsoever unless it has been thoroughly steamed initially before drying. Obviously, with this construction any desired degree of heat may be secured at any desired degree of pressure and the articles may be submitted to the action of steam for any required length of time. This uniform pressure, uniform heat and uniform moistening cannot be secured by the injection of water or steam into the ordinary tunnel for the reasons above stated. Of course, the materials may be bleached initially while they are being steamed by discharging fumes of sulphur into the interior of the bell, as for instance through a pipe 54 discharging into the bell, as through the floor 35 for instance or through the side of the bell. These sulphur fumes, of course, will be carried off into the tunnel and ejected with the steam through that end of the tunnel which is open to the atmospheric air so that the chamber 10 may be entirely cleared of the sulphur fumes before the workman enters the chamber after the bell is raised and before the door 12 is opened.

I claim:—

1. A step in the process of dehydrating fruit and vegetables consisting in subjecting the fruit and vegetables from three to five minutes in a closed chamber to steam at a temperature of approximately 102°F.

2. A process of treating fruit and vegetables consisting in first subjecting the fruit or vegetables in a closed chamber to the action of steam at a pressure of from two to fifteen atmospheres and at a temperature of approximately 102°F, then opening said chamber to release the steam and subjecting the material to the action of a current of air to remove moisture from the material.

3. An apparatus for treating materials for dehydration including a bell-shaped chamber open at its lower end and vertically movable, a floor against which the lower end of the chamber is adapted to abut to thereby close the chamber, means for raising or lowering the bell-shaped chamber, a steam coil carried by the chamber and disposed therewithin and having discharge openings, and a flexible conduit exterior to the chamber and connecting the coil and conducting steam thereto.

4. An apparatus for treating materials for dehydration including a floor having a track and a circular seat intersected by the track, a vertically movable, inverted, bell-shaped chamber adapted to rest at its lower end upon said seat to thereby close the chamber, a material supporting rack movable upon said track to a position within said seat whereby the bell may be lowered over the rack, and means for admitting steam to the interior of the bell.

5. An apparatus for treating materials for dehydration including a floor having a track and a circular seat intersected by the track, a vertically movable, inverted, bell-shaped chamber adapted to rest at its lower end upon said seat to thereby close the chamber, a material supporting rack movable upon said track to a position within said seat whereby the bell may be lowered over the rack, a steam coil carried within the bell and supported thereby and adapted when the bell is lowered to surround the rack and having perforations discharging toward the center of the bell, and means when the bell is lowered for connecting the coil to a source of steam.

6. An apparatus for treating material for dehydration comprising a chamber having a door, a vertically movable, inverted bell disposed within the chamber and adapted when lowered to rest upon the floor thereof and have steam-tight engagement with the floor, a rack carrying truck adapted to be shifted into said chamber through the door thereof and into position beneath the bell, manually operable means for raising or lowering the bell, and means for admitting steam to the interior of the bell when the same is lowered.

7. An apparatus for treating material for dehydration comprising a chamber having oppositely disposed doorways, doors adapted to close said doorways, a vertically movable bell supported within said chamber and adapted to rest upon the floor thereof and have steam-tight engagement with the floor, manually operable means for raising or lowering the bell, and means for admitting steam to the bell when the latter is lowered into engagement with the floor.

8. An apparatus for treating material for dehydration comprising a chamber having oppositely disposed, main doorways, manually shiftable doors therefor, an auxiliary door to the chamber, an inverted bell disposed within the chamber between said main doorways, manually operable means exterior to the chamber for raising or lowering the bell, and means for admitting steam to the interior of the bell when the bell is lowered into engagement with the floor.

9. An apparatus for treating material for dehydration including a chamber having oppositely disposed, main doorways, doors therefor, the chamber having an auxiliary door by which it may be entered, a rack supporting truck movable through the main doorways into and out of the chamber, an inverted bell operatively supported within the chamber for vertical movement and adapted when lowered to rest upon the floor and have steam-tight engagement therewith, manually operable means exterior to the chamber whereby the bell may be raised or lowered, and means for admitting steam to the interior of the bell when the latter is lowered.

10. An apparatus for treating materials for dehydration including a chamber having oppositely disposed, main doorways and an auxiliary doorway, doors therefor, a rack supporting truck shiftable through the main doorways into or out of the chamber, columns disposed within the chamber on each side of the main doorways, a vertically movable, inverted bell slidably mounted on said columns, means for raising or lowering the bell including a manually actuatable operating device mounted upon the exterior of the chamber, and a flexible steam pipe opening upon the interior of the bell and disposed within said chamber and connected to a source of steam.

11. An apparatus for treating materials for dehydration including a chamber having oppositely disposed, main doorways and an auxiliary doorway, doors therefor, a rack supporting truck shiftable through the main doorways into or out of the chamber, columns disposed within the chamber on each side of the main doorways, a vertically movable, inverted bell slidably mounted on said columns, means for raising or lowering the bell including a manually actuatable operating device mounted upon the exterior of the chamber, a steam coil disposed within the bell and carried thereby and having inwardly directed outlet openings, and a flexible pipe within the chamber and connected to said coil and operatively connected to a source of steam.

12. An apparatus for treating material for dehydration comprising a chamber having doorways and doors therefor, an inverted bell disposed within the chamber, vertical guides for the bell, pulleys disposed above the bell, cables attached to the bell and passing over said pulleys, a counter-weight attached to one of said cables, a winding drum to which the other cable is connected, means exterior to the chamber whereby the winding drum may be operated, and means for admitting steam to the interior of the bell when the bell is lowered and resting against the floor of the chamber.

13. An apparatus for treating materials for dehydration comprising a chamber having doorways and doors therefor, a vertically movable, inverted bell disposed within said chamber, manually operable means for raising or lowering the bell, an annular channel formed in the floor of the chamber and in which the lower margin of the bell rests when the bell is lowered, the channel having packing material at its bottom, means for clamping the bell against the bottom of the channel, and means for admitting steam to the interior of the bell when it is lowered.

14. An apparatus for treating material for dehydration comprising a chamber having oppositely disposed, main openings, doors therefor, the chamber having an auxiliary opening provided with a door, the floor of the chamber having an annular seat, tracks extending through the main openings of the chamber and intersecting said seat and movable track sections at the points of intersection of the seat with the track, a vertically movable, inverted bell disposed within the chamber and adapted when lowered to rest upon said seat, releasable means for clamping the bell against the seat, means on the exterior of the chamber for raising or lowering the bell, and means for admitting steam to the bell when the latter is lowered and in engagement with the seat.

15. An apparatus for treating material for dehydration comprising a chamber having doorways and doors therefor, a truck movable into and out of the chamber through said doorways and supporting a series of horizontal racks, a vertically movable, inverted bell disposed within the chamber and adapted when lowered to have steam-tight engagement with the floor thereof and to enclose said truck and rack, manually operable means exterior to the chamber for raising or lowering the bell, a steam coil disposed within and carried by said bell and having perforations discharging centrally toward the rack, the steam coil having convolutions extending from the top of the chamber to the lower end thereof and disposed at a slight inclination whereby steam will be discharged in a series of approximately horizontal streams, and a flexible pipe carried in the chamber and discharging into the steam coil and connected to a source of steam.

In testimony whereof I hereunto affix my signature.

JOHN H. ELSPASS.